United States Patent
Kim et al.

(10) Patent No.: US 11,056,103 B2
(45) Date of Patent: Jul. 6, 2021

(54) REAL-TIME UTTERANCE VERIFICATION SYSTEM AND METHOD THEREOF

(71) Applicant: Electronics and Telecommunications Research Institute, Daejeon (KR)

(72) Inventors: Chang Hyun Kim, Daejeon (KR); Young Kil Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 65 days.

(21) Appl. No.: 16/202,580

(22) Filed: Nov. 28, 2018

(65) Prior Publication Data

US 2019/0164541 A1    May 30, 2019

(30) Foreign Application Priority Data

Nov. 28, 2017 (KR) .......................... 10-2017-0160108

(51) Int. Cl.
| | |
|---|---|
| *G10L 15/00* | (2013.01) |
| *G10L 15/18* | (2013.01) |
| *G10L 15/30* | (2013.01) |
| *G10L 15/22* | (2006.01) |
| *G06F 40/55* | (2020.01) |
| *G06F 40/30* | (2020.01) |
| *G06F 40/58* | (2020.01) |

(52) U.S. Cl.
CPC .......... *G10L 15/1815* (2013.01); *G10L 15/22* (2013.01); *G10L 15/30* (2013.01); *G06F 40/30* (2020.01); *G06F 40/55* (2020.01); *G06F 40/58* (2020.01)

(58) Field of Classification Search
CPC combination set(s) only.
See application file for complete search history.

(56) References Cited

U.S. PATENT DOCUMENTS

| | | | |
|---|---|---|---|
| 2014/0172411 A1 | 6/2014 | Kim et al. | |
| 2015/0079554 A1* | 3/2015 | Lee | G09B 19/06 434/157 |
| 2016/0182410 A1* | 6/2016 | Janakiraman | G06F 40/30 709/206 |
| 2017/0139905 A1 | 5/2017 | Na | |
| 2017/0147558 A1 | 5/2017 | Kim et al. | |
| 2018/0082197 A1* | 3/2018 | Aravamudan | G06N 5/04 |

FOREIGN PATENT DOCUMENTS

| | | |
|---|---|---|
| KR | 10-2011-0065916 | 6/2011 |
| KR | 10-2017-0057792 | 5/2017 |

* cited by examiner

*Primary Examiner* — Vu B Hang
(74) *Attorney, Agent, or Firm* — Kile Park Reed & Houtteman PLLC (57) ABSTRACT

A real-time utterance verification system according to the present invention includes a speech recognition unit configured to recognize an utterance of an utterer, a memory configured to store a program for verifying the utterance of the utterer in real time, and a processor configured to execute the program stored in the memory, wherein, upon executing the program, the processor generates and stores a list of the utterance of the utterer, performs a semantic analysis on each utterance included in the list, and generates, when the utterance is determined to be an inappropriate utterance for a listener as a result of the semantic analysis, utterance restricting information corresponding to the inappropriate utterance.

9 Claims, 4 Drawing Sheets

REAL-TIME UTTERANCE VERIFICATION SYSTEM AND METHOD THEREOF

CROSS-REFERENCE TO RELATED APPLICATION

This application claims priority to and the benefit of Korean Patent Application No. 10-2017-0160108, filed on Nov. 28, 2017, the disclosure of which is incorporated herein by reference in its entirety.

BACKGROUND

1. Field of the Invention

The present invention relates to a real-time utterance verification system and a method thereof.

2. Discussion of Related Art

Thus far, accuracy of interpretation is the biggest concern relating to real-time simultaneous interpretation technology. In other words, the focus has been on development of techniques for accurately recognizing the content of sentences uttered by an utterer, and accurately translating the uttered sentences and providing the translated sentences to listeners.

Key technologies required to accomplish this purpose include speech recognition technology that converts utterances of an utterer into accurate sentences in a text form, and automatic translation technology that accurately translates the uttered sentences into the language of the listener. In these technologies, for correct communication and correct translation, in addition to the correction of morphological errors, the correction of the content errors is necessary.

However, the conventional technology focuses only on improvements related to morphological errors made in real-time simultaneous interpretation, and there is a need for improvements in terms of content errors as well as morphological errors.

SUMMARY OF THE INVENTION

The present invention is directed to a real-time utterance verification system capable of verifying an inappropriate utterance and informing an utterer of the inappropriate utterance in real time in a real-time simultaneous interpretation situation such as a conversation or a lecture in which utterances are made in real time, such that the utterer can recognize and correct the inappropriate utterance so as to provide accurate utterance verification to listeners, a method thereof.

The technical objects that can be achieved through the embodiments are not limited to what has been particularly described herein above and there may be other technical objects.

According to an aspect of the present invention, there is provided a real-time utterance verification system, including: a speech recognition unit configured to recognize an utterance of an utterer; a memory configured to store a program for verifying the utterance of the utterer in real time; and a processor configured to execute the program stored in the memory. Herein, upon executing the program, the processor generates and stores a list of the utterance of the utterer, performs a semantic analysis on each utterance included in the list, and generates, when the utterance is determined to be an inappropriate utterance for a listener as a result of the semantic analysis, utterance restricting information corresponding to the inappropriate utterance.

The processor may provide the utterance restricting information to the utterer and perform, upon receiving from the utterer the utterance in which the utterance restriction information has been removed, a semantic analysis on the received utterance.

The processor may provide the utterance restricting information to the utterer before the utterance of the utterer is provided to the listener.

The processor may remove one or more of noise included in the utterance recognized through the speech recognition unit and a speech not used in the verification.

The processor may perform the semantic analysis based on the same or similar semantics of one or more of subject, object, predicate, complement, idiom, adverb, time information, sentence structure information, and tense information about the utterances included in the list. Alternatively, the processor may construct semantic vectors for one or more continuous sentences based on a vector such as a word embedding vector and analyze the semantics based on the semantic vectors.

Listener-related knowledge collected from the listener and listener-related restriction knowledge collected through prior learning may be stored in a knowledge database stored in the memory. When there is the listener-related restriction knowledge matching the listener-related knowledge as a result of the semantic analysis, the processor may generate utterance restricting information corresponding to the inappropriate utterance. In this case, listener-related restriction knowledge includes not only existing learning knowledge but also knowledge that is generated and changed in real time, such as news, as well as the existing learnable knowledge.

The processor may update the listener-related knowledge and the listener-related restriction knowledge stored in the knowledge database, based on a result of a semantic analysis performed on a conversation between the utterer and the listener.

The processor may perform a semantic analysis on a first utterance and a second utterance of the utterer included in the list, and generate the utterance restricting information when a semantic association between the first utterance and the second utterance does not satisfy a preset condition as a result of the semantic analysis. Herein, the first utterance may be one or more preceding utterances and the second utterance may be a current utterance.

According to another aspect of the present invention, there is provided a method of verifying an utterance in a real-time utterance verification system, the method including: receiving an utterance of an utterer; converting the utterance of the utterer into text; generating and storing a list of the converted utterance; performing a semantic analysis on each utterance included in the list; and generating, when an utterance is determined to be an inappropriate utterance for a listener as a result of the semantic analysis, utterance restricting information corresponding to the inappropriate utterance.

The method may further include: providing the generated utterance restricting information to the utterer; receiving, from the utterer, an utterance in which the utterance restricting information has been removed; and performing a semantic analysis on the received utterance.

The providing of the generated utterance restricting information to the utterer may be performed before the utterance of the utterer is provided to the listener.

The generating of the utterance restricting information may include generating the utterance restricting information corresponding to the inappropriate utterance when there is listener-related restriction knowledge matching listener-related knowledge as the result of the semantic analysis, wherein the listener-related knowledge may be collected from the listener, and the listener-related restriction information may be collected through prior learning and stored in a knowledge database.

The method may further include updating the listener-related knowledge and the listener-related restriction knowledge stored in the knowledge database, based on a result of a semantic analysis performed on a conversation between the utterer and the listener.

The performing of the semantic analysis may include performing a semantic analysis on a first utterance and a second utterance of the utterer included in the list, wherein the generating of the utterance restricting information may include generating the utterance restricting information when a semantic association between the first utterance and the second utterance does not satisfy a preset condition as the result of the semantic analysis. Herein, the first utterance may be one or more preceding utterances and the second utterance may be a current utterance.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Exemplary embodiments of the present invention will be described in detail below with reference to the accompanying drawings to enable those skilled in the art to practice the present invention. The present invention may, however, be embodied in many different forms and should not be construed as being limited to the embodiments set forth herein. In order to clearly explain the present invention in the drawings, parts not related to the description are omitted.

Whenever a part is stated as "including" or "comprising" an element throughout the specification, it will be understood that the part may include other elements as well, unless specifically stated otherwise.

Exemplary embodiments of the present invention relate to a real-time utterance verification system 100 and an utterance verification method thereof.

Since the real-time simultaneous interpretation uses speech as input, the utterance of an utterer may have noise, unlike the translation. The noise is an element that causes translation errors in the interpretation. Therefore, in the speech recognition and automatic translation operations, it is necessary to identify the elements causing the translation errors to reduce translation errors.

That is, it is necessary to identify and correct morphological errors of utterances by, for example, eliminating or modifying inappropriate speech and words in the sentences uttered by an utterer.

In addition, even if speech recognition is performed accurately, errors may be produced during translation of a recognized text. To address this issue, re-translation of the translation result may be performed, and feedback may be provided to the utterer, such that the utterer can estimate the result of his or her utterance transmitted to the listener.

In view of the above, it is not only necessary to improve the morphological errors in the real-time simultaneous interpretation, but it is also necessary to improve the content errors. That is, the techniques for improvement related to the above-described morphological errors basically assume that the content of the utterance of an utterer has no problem in the corresponding real-time interpretation situation.

However, in reality, there is a limit to the extent to which the utterer sufficiently verifies and controls his or her utterance in situations where real-time interpretation is required. Due to this limit, the utterance may be a problem for the listener. In other words, a problem may be caused in real-time simultaneous interpretation due to a content-related issue rather than a morphological issue of the utterance of the utterer.

With the real-time utterance verification system 100 and the utterance verification method thereof according to the embodiments of the present invention, in a real-time simultaneous interpretation situation such as a conversation or a lecture in which utterances are made in real time, whether an utterance of an utterer can raise a content-related problem for a listener may be determined and the utterer may be informed thereof in real time before the utterance is delivered to the listener through auto-interpretation.

Accordingly, according to the embodiment of the present invention, personal, cultural, or situational problems that may be caused due to the real-time nature of the conventional real-time interpretation may be eliminated in advance, and therefore simultaneous interpretation may be performed smoothly.

Here, the content-related problems that may be caused to the listener may be personal, cultural, or situational problems that may be caused, for example, when there is a mistake in the utterance of the utterer or when the listener misunderstands utterances of the utterer.

In an embodiment of the present invention, the utterer or listener is not necessarily limited to a person, and at least one of the utterer and the listener may be a typical loudspeaker, an artificial intelligence (AI) speaker, or the like. That is, in an embodiment of the present invention, the conversation between the utterer and the listener may be output by a sound output device, or may be a text rather than a sound output.

Also, in an embodiment of the present invention, verification of simultaneous interpretation is exemplified for explaining real-time utterance verification, but the embodiment of the present invention is not limited thereto. That is, the present invention can be applied not only to the simultaneous interpretation situation between the mother tongue and the foreign language but also to the situation for verifying the utterance between the mother tongue and the the mother tongue, or between the foreign language and the foreign language.

Hereinafter, a real-time utterance verification system 100 according to an embodiment of the present invention will be described with reference to FIGS. 1 to 3.

Figure 1:
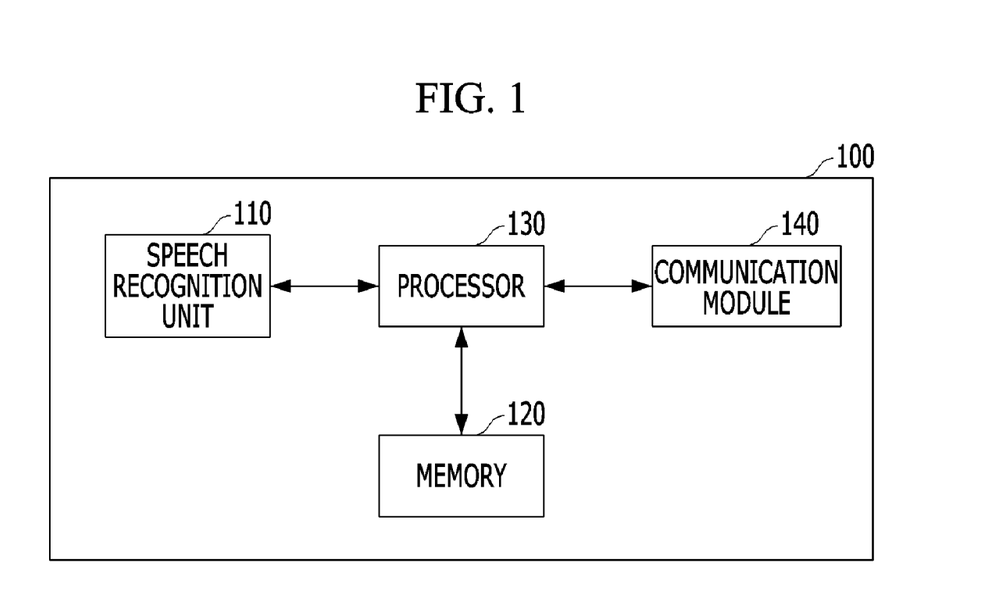
FIG. 1 is a block diagram of a real-time utterance verification system according to an embodiment of the present invention.

FIG. 1 is a block diagram of a real-time utterance verification system 100 according to an embodiment of the present invention.

The real-time utterance verification system 100 according to the embodiment of the present invention includes a speech recognition unit 110, a memory 120, and a processor 130.

The speech recognition unit 110, which is configured to recognize an utterance of an utterer, may correspond to a microphone. The utterance input through the microphone or an interpretation result thereof may be output through a loudspeaker.

The memory 120 stores a program configured to verify and automatically interpret the utterance of an utterer in real time. Here, the memory 120 collectively refers to a non-volatile storage device, which maintains the stored information even when power is not supplied, and a volatile storage device.

For example, the memory 120 may include NAND flash memories such as a compact flash (CF) card, a secure digital (SD) card, a memory stick, a solid-state drive (SSD), and a micro SD card, magnetic disk storage devices such as a hard disk drive (HDD), and optical disk drives such as a compact disc read-only memory (CD-ROM) and a digital versatile disc read-only memory (DVD-ROM).

In addition, the memory 120 may store a knowledge database 121, which will be described later.

According to an embodiment of the present invention, the real-time interpretation system 100 may further include a display module (not shown). A real-time interpretation result of the utterance of the utterer or a verification result of the utterance of the utterer may be output through the display module. Listener-related knowledge and listener-related restriction knowledge may also be output.

In addition, according to an embodiment of the present invention, the real-time utterance verification system 100 may be implemented as a computer system that is distinguished from a terminal of the utterer and a terminal of the listener. In this case, the real-time utterance verification system 100 may further include a communication module.

The communication module 140 may transmit and receive data to and from the terminal of the utterer and the terminal of the listener. That is, the communication module 140 may provide a result of automatic interpretation of the utterance of the utterer to the terminal of the utterer and the terminal of the listener in real time, and provide a verification result of the utterance of the utterer to the terminal of the utterer. In addition, the communication module 140 may receive the listener-related knowledge and the listener-related restriction knowledge collected through the terminal of the listener.

Here, the communication module 140 may include both a wired communication module and a wireless communication module. The wired communication module may be implemented by a power line communication device, a telephone line communication device, a cable home (MoCA), Ethernet, IEEE1294, an integrated wired home network, and an RS-485 control device. In addition, the wireless communication module may be implemented by wireless local area network (WLAN), Bluetooth, high data rate wireless personal area network (HDR WPAN), ultra-wideband (UWB), ZigBee, Impulse Radio, 60 GHz WPAN, Binary-code division multiple access (CDMA), wireless Universal Serial Bus (USB), or wireless high definition multimedia interface (HDMI) technologies.

In the present invention, the terminal of the utterer and the terminal of the listener may be notebook computers, desktop computers, or laptop computers equipped with a web browser, or smart terminals, which are configured by adding computer supportable functions including Internet communication and information search to portable terminals, such as cellular phones, smart phones, pads, smart watches, wearable terminals, or other mobile communication terminals on which multiple application programs (i.e., applications) desired by a user can be installed and executed.

The terminals may also be implemented in the form of a cable TV, an Internet protocol TV (IPTV), or a TV operatively connected with broadcasting services such as satellite broadcasting, over-the-air data broadcasting, digital multimedia broadcasting (DMB), and Internet broadcasting.

The processor 130 executes a program stored in the memory 120. Hereinafter, functions performed by the processor 130 of the present invention will be described in detail with reference to FIGS. 2 and 3.

Figure 2:
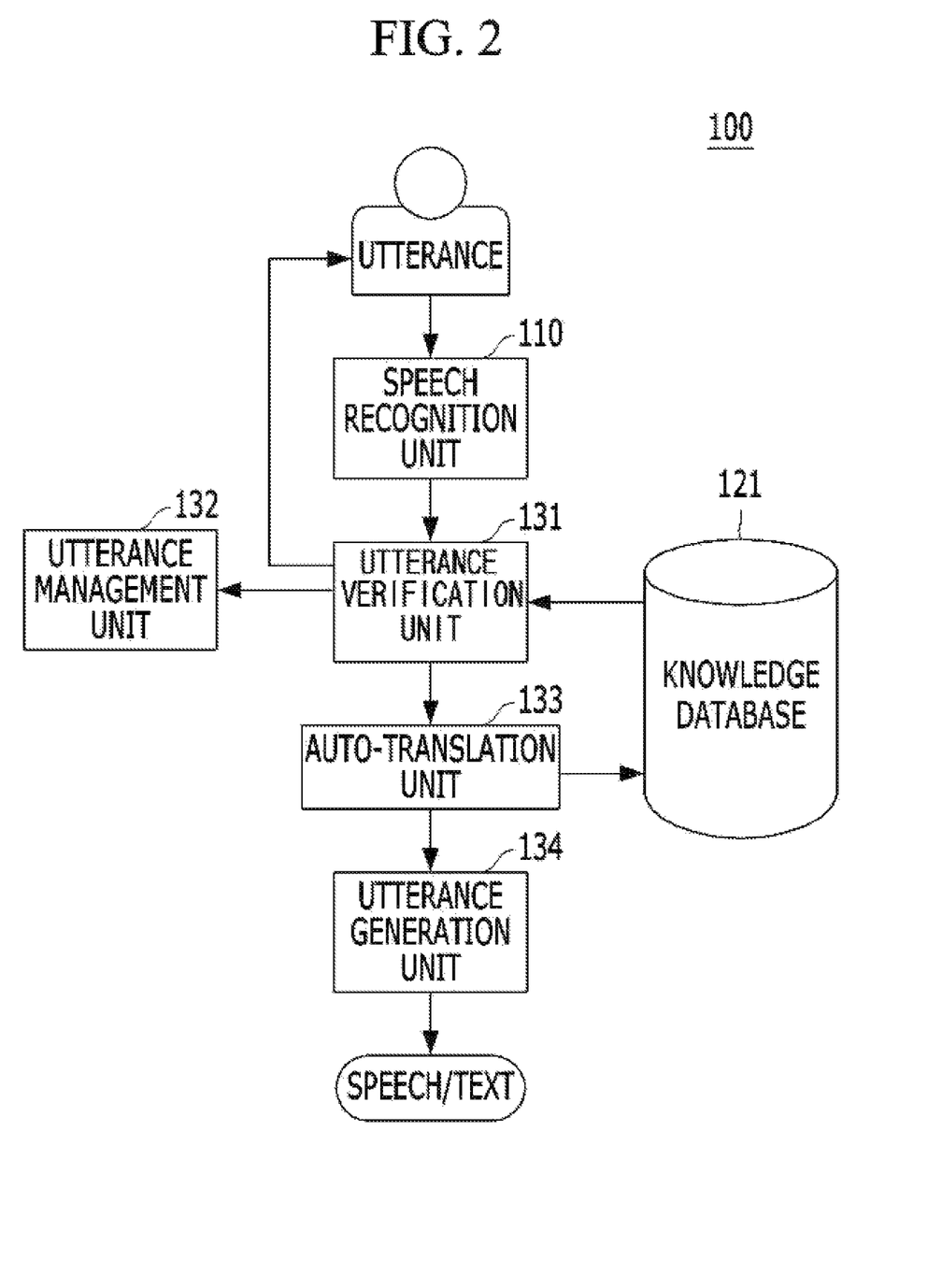
FIG. 2 is a diagram for describing functions of the real-time utterance verification system according to the embodiment of the present invention.

FIG. 2 is a diagram for describing functions of the real-time utterance verification system 100 according to the embodiment of the present invention. FIG. 3 is a diagram for describing a bidirectional flow in a real-time utterance verification system 100 according to an embodiment of the present invention.

Initially, the real-time utterance verification system 100 receives an utterance of an utterer through the speech recognition unit 110.

Then, the utterance of the utterer may be converted into a text form by the processor 130. In this process, the processor may identify and remove various types of noise included in the utterance recognized through the speech recognition unit 110. The processor may also identify and remove the voice included in the utterance of the utterer but not used in translation.

An utterance verification unit 131 is configured to verify whether the utterance of the utterer recognized by the speech recognition unit 110 is an appropriate utterance in the corresponding interpretation environment. When it is determined that the utterance is an inappropriate utterance for the listener, the utterance verification unit generates corresponding interpretation restricting information. The utterance verification unit is an element that is comparable to a conventional interpretation system. In this case, the interpretation restricting information is a term for describing the interpretation example, and has the same meaning as the utterance limitation information in the embodiment of the present invention.

Here, in order to verify whether the utterance of the utterer is an appropriate utterance in the corresponding interpretation environment, an embodiment of the present invention may include an utterance management unit 132 and a knowledge database 121.

The utterance management unit 132 generates a list of utterances of the utterer, and performs a semantic analysis on each of the utterances included in the list. In this operation, the utterance management unit 132 may perform the semantic analysis based on the same or similar semantics of one or more of subject, object, predicate, complement, idiom, adverb, time information, sentence structure information, and tense information about the utterances included in the list. Alternatively, it may construct semantic vectors for one or more continuous sentences based on a vector such as word embedding vector and analyze the semantics based on these vectors. The semantic analysis may be performed not only in terms of sentences and paragraphs but also in relation to the whole context.

For example, suppose that the following two sentences are uttered.

A: "What do you think I ate for lunch?"
B: "Pork."

For these two utterances, the utterance management unit 132 analyzes the semantics of each sentence and stores the respective semantic for each sentence. An example of the semantics configured through the analysis of each sentence is as follows, and the semantic analysis result is not necessarily limited to the following form.

A: Eat (Subject: I, Object: what, Time: lunch, Sentence Structure: interrogative, Tense: past)
B: Eat (Subject: I, Object: pork, Time: lunch, Sentence Structure: declarative, Tense: past)

In this case, the utterance management unit 132 may perform semantic analysis on the continuous utterance of a first utterer and the utterance of a second utterer following the utterance of the first utterer. Accordingly, the analysis result of sentence B may be analyzed in association with the flow of sentence A.

The knowledge database 121 has built-in knowledge for determining whether the utterance analyzed by the utterance management unit 132 is an appropriate utterance in terms of the meaning of the utterance. The knowledge may include listener-related knowledge collected from a listener and listener-related restriction knowledge collected through prior learning.

The knowledge included in the knowledge database 121 may be provided on-line or off-line, and is not particularly limited.

The listener-related knowledge and the listener-related restriction knowledge mean knowledge that is built based on information collected from the terminal of the listener or information collected in advance through a face-to-face operation with the listener or collected and identified in real time.

For example, the knowledge that can be collected through a face-to-face operation may include a language, nationality and a place of birth, a religion, an e-mail address, social network service (SNS) information, a country and location where conversation occurs, and content of the conversation with the listener.

Thus, the embodiment of the present invention may determine personal, cultural, and situational information that can cause problems to the listener and the corresponding types of utterances by collecting and building the listener-related knowledge and the listener-related restriction knowledge.

In addition, by identifying the language, nationality, place of birth, religion, and the like of the listener, situations that cause any problem or impoliteness to the listener in terms of language, nationality, place of birth, religion, and the like may be identified.

In addition, by analyzing the SNS contents of the listener through the SNS information, various kinds of information and tendencies including the interest and hobby of the listener may be identified.

Here, the analysis of the language of the listener may be performed by directly analyzing the language or after automatic translation of the language into the language of the utterer.

Knowledge that does not need to be identified through a face-to-face operation, namely, in real time, may also be stored in the knowledge database 121. Such information may correspond to, for example, knowledge that Muslim people do not eat pork, or that Westerners do not ask personal information, such as the age or height of a person.

The processor 130 may update the listener-related knowledge stored in the knowledge database 121 and the listener-related restriction knowledge based on the result of semantic analysis of the conversation between the utterer and the listener. Accordingly, the information on the listener that has not been identified may be additionally identified through utterances of the utterer during conversation with the listener to identify situations that cause any problem.

When there is listener-related restriction knowledge matching the listener-related knowledge based on the result of semantic analysis obtained using the knowledge stored in the knowledge database 121, the utterance verification unit 131 may generate interpretation restricting information corresponding to an inappropriate utterance.

In the above-described example, when the utterer estimates and utters "pork" as the lunch menu of the listener in a situation where the listener has spoken his or her religion, nationality, propensity, or SNS through his or her own utterance and is thus identified as a Muslim or a vegetarian, the utterance verification unit 131 may confirm that the utterance of the utterer is inappropriate, using the knowledge built in the knowledge database 121, generate interpretation restricting information corresponding to the utterance, and provide the generated information to the utterer.

The interpretation restricting information may be provided to the utterer before the utterance of the utterer is interpreted and provided to the listener. The utterer will receive the interpretation restricting information and modify his/her utterance. Upon receiving from the utterer a new utterance in which the utterance restricting information has been removed, the utterance verification unit 131 will perform a semantic analysis on the received utterance again and determine whether the utterance is an appropriate utterance.

The utterance verification unit 131 may serve to verify the current utterance of the utterer with respect to the utterer's previous utterances or with respect to the facts as well as the content of the utterance of the utterer with respect to the listener. To this end, the utterance management unit 132 may perform a semantic analysis on the first utterance and the second utterance of the utterer included in the list, and the utterance verification unit 131 may generate interpretation restricting information when a semantic association between the first utterance and the second utterance does not satisfy a preset condition as a result of the semantic analysis. Here, the first utterance may be zero, one or more preceding utterances and the second utterance may be the current utterance.

For example, suppose that an utterer has made the following two inconsistent utterances.

Utterance A: "The noodle soup that I ate for lunch was really tasty."
Utterance B: " . . . "
Utterance A: "When you have time, I'll take you to that meat restaurant."

For example, the utterance verification unit 131 may determine whether the current utterance of the utterances above is associated with the previous utterance or whether the current utterance of the utterances is consistent with the definite facts. If problems such as relevant but lack of accuracy are detected, the utterance verification unit generates interpretation restricting information as a result of the determination, and provides the generated information to the utterer, such that the utterer can determine whether the utterance is what the utterer actually intended or a mistake.

Additionally, an auto-translation unit 133 carries out translation that is needed to translate the utterance of the utterer in real time and build knowledge, and the utterance generation unit 134 outputs a text or a speech for a translation result of the utterance, namely, an auto-interpretation result.

Figure 3:
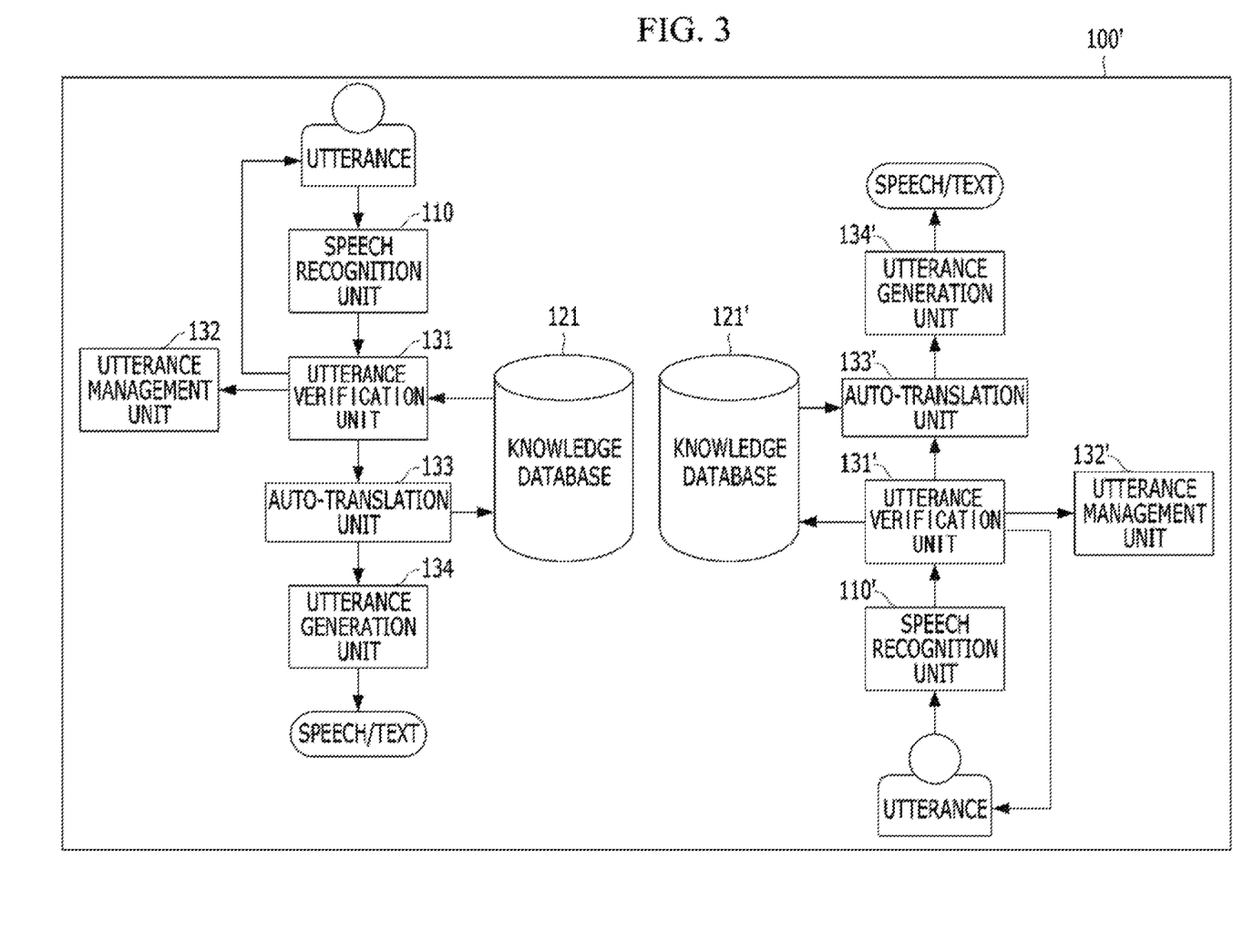
FIG. 3 is a diagram for describing a bidirectional flow in a real-time utterance verification system according to an embodiment of the present invention.

In the real-time utterance verification system 100' according to an embodiment of the present invention, the interpretation, in which the utterer can be a listener and the listener can be an utterer, may be performed in both directions due to the nature of the interpretation as shown in FIG. 3.

For reference, the elements shown in FIGS. 1 to 3 according to the embodiments of the present invention may be implemented in the form of software or hardware such as a field programmable gate array (FPGA) or an application specific integrated circuit (ASIC), and may perform predetermined roles.

However, the "elements" are not limited to software or hardware. Each element may be configured to be in an addressable storage medium or configured to operate one or more processors.

Thus, as an example, the elements include elements such as software elements, object-oriented software elements, class elements and task elements, processes, functions, attributes, procedures, subroutines, segments of program code, drivers, firmware, microcode, circuits, data, databases, data structures, tables, arrays, and parameters.

The elements and the functions provided in the elements may be combined into fewer elements or may be further separated into additional elements.

Hereinafter, an utterance verification method in the real-time utterance verification system 100 according to an embodiment of the present invention will be described with reference to FIG. 4.

Figure 4:
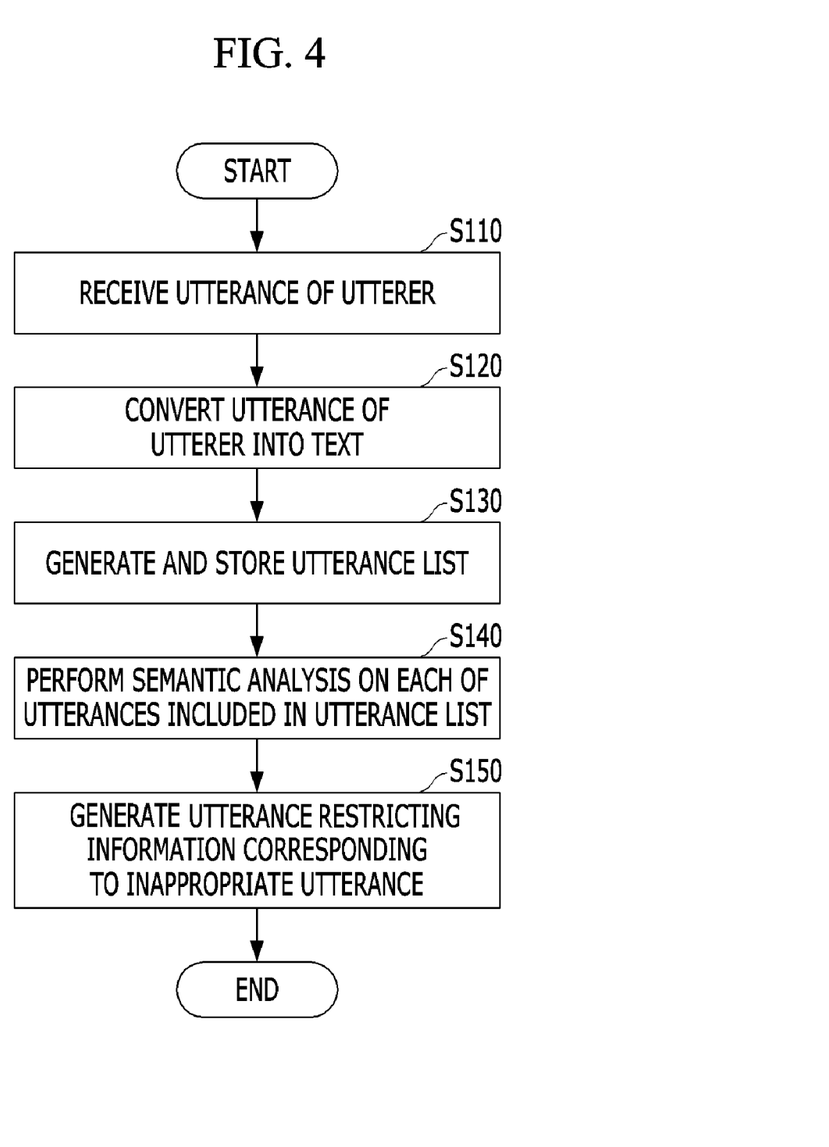
FIG. 4 is a flowchart of an utterance verification method according to an embodiment of the present invention.

FIG. 4 is a flowchart of an utterance verification method according to an embodiment of the present invention.

In the utterance verification method according to the embodiment of the present invention, when utterances of an utterer are received (S110), the utterances of the utterer are converted into text (S120).

Next, a list of the converted utterances is generated and stored (S130), and a semantic analysis is performed on each of the utterances included in the list (S140).

Next, when it is determined that an utterance is inappropriate for the listener as a result of the semantic analysis, the interpretation restricting information corresponding to the inappropriate utterance is generated and provided to the utterer (S150).

When the utterance restricting information is provided to the utterer and confirmed by the utterer, and thus a new utterance with the utterance restricting information removed is received from the utterer, the semantic analysis is performed on the newly received utterance again to determine whether the utterance can be interpreted and provided to the listener.

As described above, according to the embodiment of the present invention, the interpretation restricting information is provided to the utterer before the interpretation corresponding to the utterance of the utterer is provided to the listener. Thereby, interpretation which can cause a personal, cultural, situational problem may be prevented from being provided to the listener.

The interpretation restricting information may be generated when there is listener-related restriction knowledge matching the listener-related knowledge as a result of the semantic analysis. In this operation, the interpretation restricting information may be generated based on the listener-related knowledge collected from the listener and built in the knowledge database 121 and listener-related restriction knowledge collected through prior learning.

Of course, the knowledge database 121 that is constructed in this way can be additionally updated based on the result of the semantic analysis of the conversation between the utterer and the listener.

In the description above, operations S110 to S150 may be further divided into additional operations or combined into fewer operations, according to some embodiments of the present invention. Further, some of the operations may be omitted as necessary, and the order in which the operations are arranged may be changed. In addition, the features described above in relation to the real-time utterance verification system 100 of FIGS. 1 to 3, including features not described in this embodiment, can be applied to the utterance verification method of FIG. 4.

An embodiment of the present invention may also be implemented in the form of a computer program stored in a medium executed by a computer or the form of a recording medium including commands executable by a computer. The computer readable medium may be any available medium that can be accessed by a computer and includes volatile and nonvolatile media and both removable and non-removable media. The computer-readable medium may also include both a computer storage medium and a communication medium. The computer storage medium includes volatile and nonvolatile and removable and non-removable media implemented using any method or technology for storage of computer-readable commands, data structures, program modules or other information such as data. The communication medium typically includes any information transfer medium, including computer readable commands, data structures, program modules, other data in modulated data signals such as carrier waves, or other transmission mechanisms.

While the method and system of the present invention have been described with reference to particular embodiments, some or all of the elements or operations thereof may be implemented using a computer system having a general purpose hardware architecture.

According to any one of the above-described objects of the present invention, in a real-time simultaneous interpretation situation such as a conversation or a lecture in which utterances are made in real time, whether an utterance of an utterer can raise a content-related problem for a listener may be determined and the utterer may be informed thereof in real time before the utterance is delivered to the listener through auto-interpretation.

Accordingly, according to embodiments of the present invention, personal, cultural, or situational problems that may be caused due to the real-time nature of the conventional real-time interpretation may be eliminated in advance, and therefore simultaneous interpretation may be performed smoothly.

The foregoing description of the present invention has been presented for purposes of illustration and description, and it will be apparent to those skilled in the art that various modifications can be made to the above-described exemplary embodiments of the present invention without departing from the spirit or scope of the invention. It is therefore to be understood that the above-described embodiments are illustrative in all aspects and not restrictive. For example, each element described as a single entity may be distributed and implemented, and elements described as being distributed may be implemented in a combined form.

The scope of the present invention is defined by the appended claims rather than the foregoing description, and it is intended that the present invention cover the modifications and variations of this invention provided they come within the scope of the appended claims and their equivalents.

What is claimed is:

1. A real-time utterance verification system, comprising:
a speech recognition unit configured to recognize in real-time an utterance of an utterer;
a memory configured to store a program for verifying the utterance of the utterer in real-time; and
a processor configured to execute the program stored in the memory,
wherein, upon executing the program, the processor converts its real-time the utterance of the utterer received from the speech recognition unit into text, generates and stores in real-time a list of the converted utterance of the utterer, performs in real-time a semantic analysis on each utterance included in the list, and when the utterance is determined to be an appropriate utterance for a listener as a result of the semantic analysis, carries out in real-time translation that is needed to translate the utterance of the utterer and outputs th translation result of the utterance, when the utterance is determined to be an inappropriate utterance for a listener as a result of the semantic analysis, generates utterance restricting information corresponding to the inappropriate utterance and provides the utterance restricting information to the utterer, and
receives, from the utterer, an utterance in which the utterance restricting information has been removed and performs a semantic analysis on the receive utterance, and, when the received utterance is determined to be an appropriate utterance for a listener as a result of the semantic analysis carries out translation of the received utterance and outputs the translation result of the receive utterance.

2. The real-time utterance verification system of claim 1, wherein the processor performs the semantic analysis based on the same or synonymous semantics of one or more of subject, object, predicate, complement, idiom, adverb, time information, sentence structure information, and tense information about the utterance included in the list, or constructs semantic vectors for one or more continuous sentences based on a word embedding vector and analyzes the semantics based on the semantic vectors.

3. The real-time utterance verification system of claim 1, wherein listener-related knowledge collected from the listener and listener-related restriction knowledge collected through prior learning are stored in a knowledge database stored in the memory,
wherein, when there is the listener-related restriction knowledge matching the listener-related knowledge as a result of the semantic analysis, the processor generates utterance restricting information corresponding to the inappropriate utterance.

4. The real-time utterance verification system of claim 3, wherein the processor updates the listener-related knowledge and the listener-related restriction knowledge stored in the knowledge database, based on a result of a semantic analysis performed on a conversation between the utterer and the listener.

5. The real-time utterance verification system of claim 1, wherein the processor performs a semantic analysis on a first utterance and a second utterance of the utterer included in the list, and generates the utterance restricting information when a semantic association between the first utterance and the second utterance does not satisfy a preset condition as a result of the semantic analysis,
wherein the first utterance is zero, one or more preceding utterances and the second utterance is a current utterance.

6. A method of verifying an utterance in a real-time utterance verification system, the method comprising:
receiving in real-time an utterance of an utterer;
converting in real-time the utterance of the utterer into text;
generating and storing in real-time a list of the converted utterance;
performing a semantic analysis in real-time on each utterance included in the list,
when the utterance is determined to be an appropriate utterance for a listener as a result of the semantic analysis, carrying out in real-time translation that is needed to translate the utterance of the utterer and outputting the translation result of the utterance;
when the utterance is determined to be an inappropriate utterance for a listener as a result of the semantic analysis, generating utterance restricting information corresponding to the inappropriate utterance and providing the utterance restricting information to the utterer; and
receiving, from the utterer, an utterance in which the utterance restricting information has been remove and performing a semantic analysis on the received utterance, and, when the received utterance is determined to be an appropriate utterance for a listener as a result of the semantic analysis, carrying out transition of the received utterance and outputting the translation result of the received utterance.

7. The method of claim 6, wherein the generating of the utterance restricting information comprises:
generating the utterance restricting information corresponding to the inappropriate utterance when there is listener-related restriction knowledge matching listener-related knowledge as the result of the semantic analysis,
wherein the listener-related knowledge is collected from the listener, and the listener-related restriction information is collected through prior learning and stored in a knowledge database.

8. The method of claim 7, further comprising updating the listener-related knowledge and the listener-related restriction knowledge stored in the knowledge database, based on a result of a semantic analysis performed on a conversation between the utterer and the listener.

9. The method of claim 6, wherein the performing of the semantic analysis comprises performing a semantic analysis on a first utterance and a second utterance of the utterer included in the list,
wherein the generating of the utterance restricting information comprises generating the utterance restricting information when a semantic association between the first utterance and the second utterance does not satisfy a preset condition as the result of the semantic analysis, and
wherein the first utterance is one or more preceding utterances and the second utterance is a current utterance.

* * * * *